United States Patent

Duffy et al.

[15] 3,641,307

[45] Feb. 8, 1972

[54] THERMOMETER TRIMMING METHOD AND APPARATUS

[72] Inventors: Joseph J. Duffy, Northport; Stuart Donald Sims, Huntington, both of N.Y.

[73] Assignee: Hadron, Inc., Westbury, N.Y.

[22] Filed: Nov. 26, 1968

[21] Appl. No.: 779,197

[52] U.S. Cl............................................................219/121
[51] Int. Cl.................................................................B23k 9/00
[58] Field of Search........................219/121; 269/55; 331/94.5

[56] References Cited

UNITED STATES PATENTS

| | | | |
|---|---|---|---|
| 3,210,171 | 10/1965 | MacDonald | 219/121 L |
| 3,364,087 | 1/1968 | Solomon et al | 219/121 L |
| 3,472,998 | 10/1969 | Popick et al | 219/121 L |

*Primary Examiner*—J. V. Truhe
*Assistant Examiner*—Lawrence A. Rouse
*Attorney*—Yuter and Fields

[57] ABSTRACT

Apparatus for trimming a thermometer to remove excess mercury including a fixture mounted on a laser device in energy-receiving relationship therewith. The fixture includes a housing having an open end through which a thermometer-holding device is adapted to move between a thermometer-inserting position and a thermometer-aligned position wherein the thermometer is aligned with the laser beam. A light trap is provided for sealing the open end of the housing when the thermometer holding device is in the thermometer-aligned position to prevent the leakage of energy from the laser device through the open end of the housing.

A method for trimming a thermometer also is disclosed.

17 Claims, 3 Drawing Figures

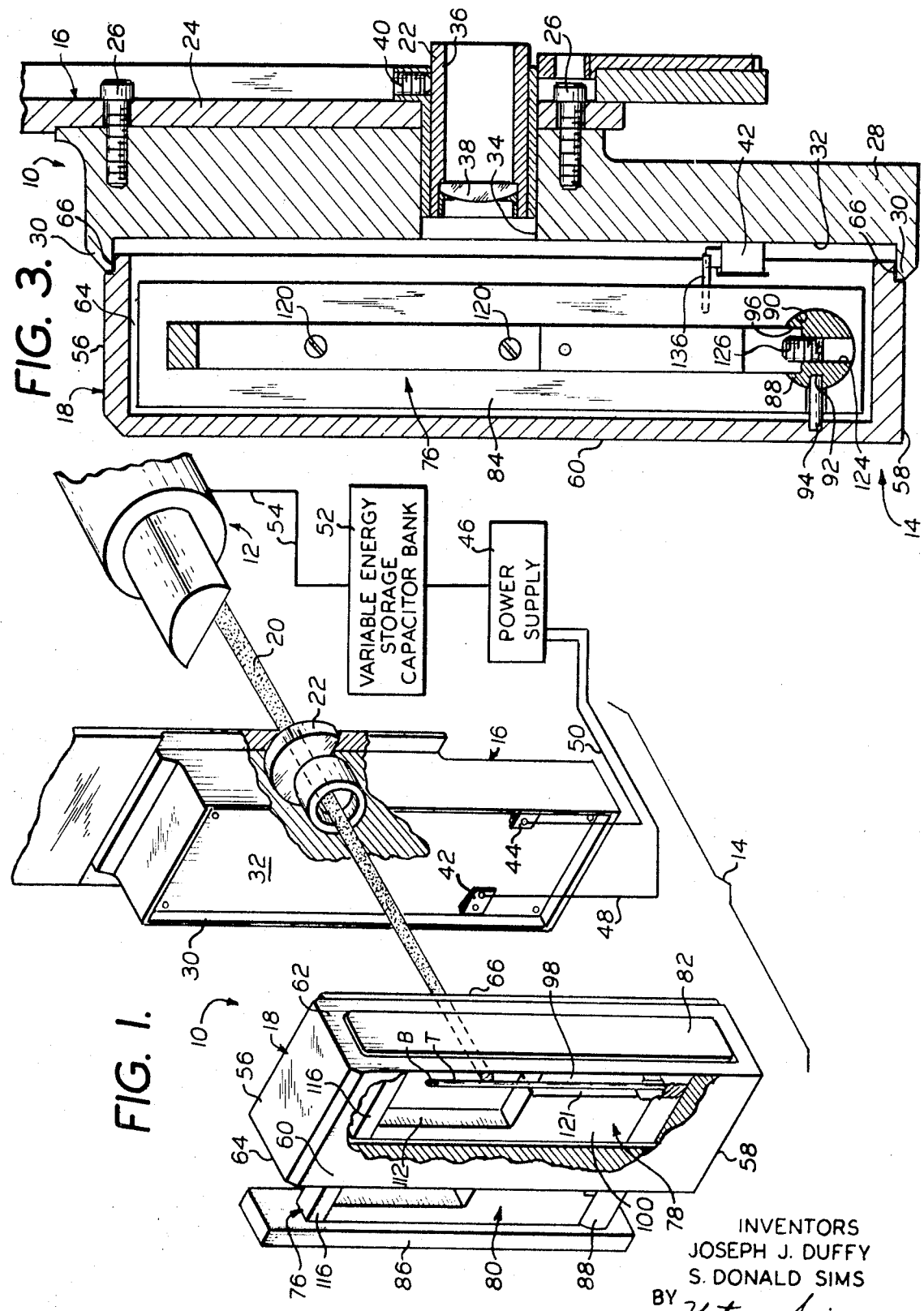

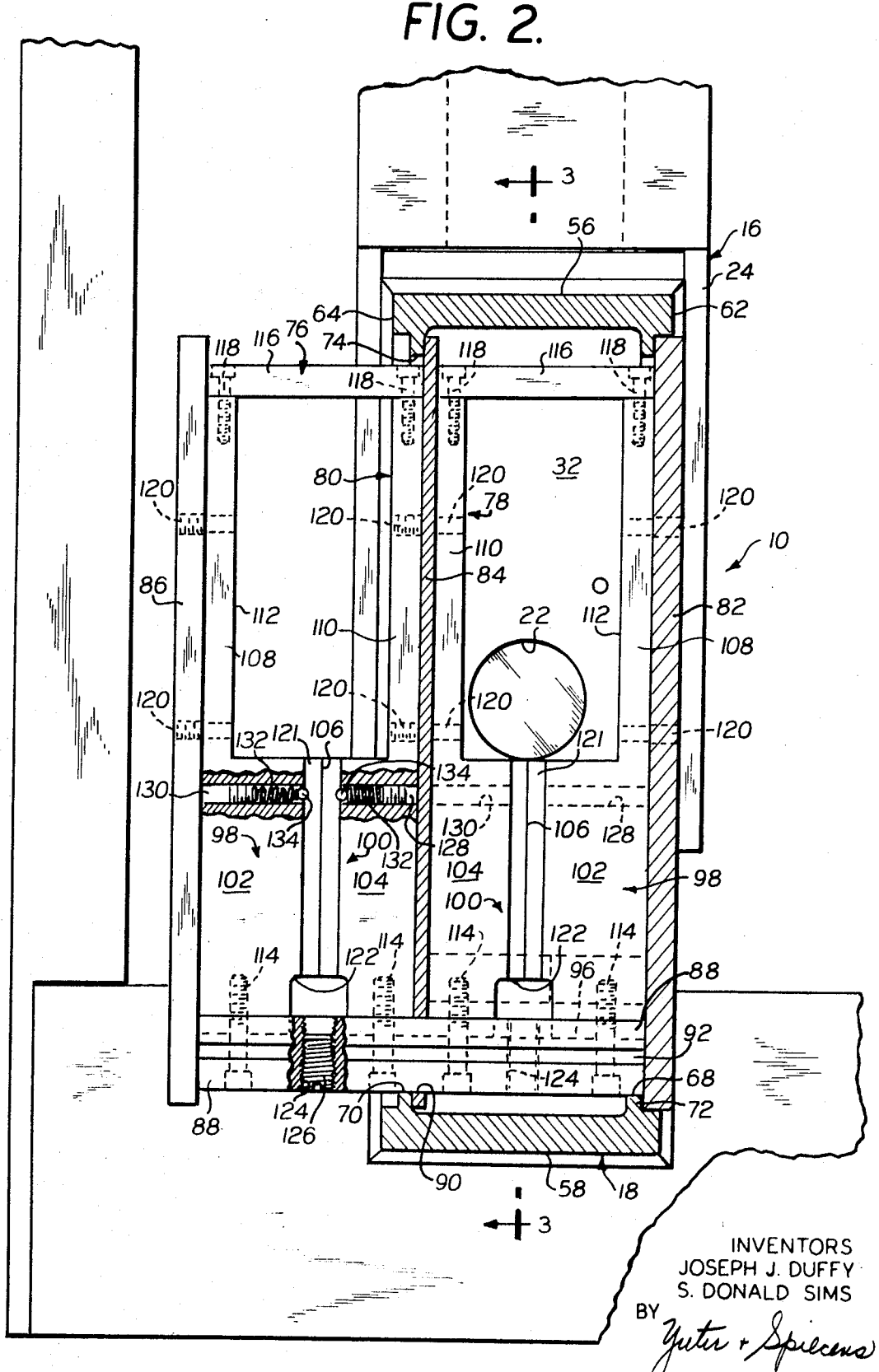

THERMOMETER TRIMMING METHOD AND APPARATUS

This invention relates generally to a thermometer-trimming method and apparatus therefor and, more particularly, pertains to an apparatus for and a method of removing excess mercury from a thermometer.

Inherent in the manufacture of mercury thermometers for laboratory or clinical use or the like is the need to remove the excess mercury from the capillary tube after it has been filled. One method which is widely used is referred to as the so-called gas torch method wherein each thermometer is placed in a clamp and a gas torch is applied to the thermometer at the point at which the mercury column is to be severed. The heat from the torch causes the mercury to vaporize at that point to separate the excess from the column of mercury. Thereafter, the thermometer is placed in a centrifuge which drives the excess mercury into a ball at the top of the tube which is then severed from tube and the thermometer sealed.

It is obvious that the above-described procedure is entirely unsuited for mass production techniques as it is extremely time consuming and highly unreliable. That is, the heat content of the gas torch usually varies within limits so that the operator must apply the torch for different periods of time depending on the energy of the torch at a particular instant. Moreover, the services of a skilled person are required for this operation thereby increasing the cost of such devices. Additionally, if the torch is applied for too long an interval the glass will be damaged. Hence a relatively high rate of damaged thermometers are produced by this method.

Another equally disadvantageous method presently in use for trimming thermometers includes heating the reservoir of the thermometer to a preselected temperature and drawing off the excess mercury. The thermometer is then cooled to a predetermined temperature and the height of the mercury column is noted. This procedure is continued until the mercury reaches a desired height at which point the thermometer is sealed. Thus, it is obvious that this latter procedure is even more time consuming and unreliable than the former method described above.

Accordingly, an object of the present invention is to provide an improved apparatus and method for quickly and efficiently removing the excess mercury from a column of mercury in a thermometer and the like.

A more specific object of this invention is to provide an apparatus which includes a laser device for accurately trimming a thermometer.

Another object of the present invention resides in the novel details of construction which provide an apparatus of the type described which includes a fixture for accurately aligning a thermometer with a laser beam for severing a column of mercury in a thermometer at a preselected point.

A further object of the invention is the provision of thermometer-trimming apparatus which is simple in construction and reliable in operation.

Another object of the present invention is to provide thermometer-trimming apparatus which always supplies the same magnitude of energy to the thermometer and to eliminate variations in the interval of time the energy is supplied to the thermometer.

A further object of the invention is the provision of a thermometer-trimming apparatus of the type described wherein the possibility of damage to the glass thermometer tube is substantially eliminated.

Accordingly, an apparatus constructed in accordance with the present invention includes a fixture for aligning a thermometer with a laser beam which includes a housing having at least one open end. Mounting means for mounting the housing on the laser device in energy-receiving relationship therewith is provided and thermometer-holding means which includes a thermometer retainer for orienting a thermometer in a preselected position is similarly provided. The thermometer-holding means is movable through said open end between a first position in which said thermometer retainer is positioned external to the housing for the insertion of a thermometer and a second position in which said thermometer retainer is positioned within the housing to align the thermometer with the laser beam. The thermometer-holding means further includes a light trap which sealingly engages the housing when the thermometer-holding means is in the second position to prevent the leakage of energy from the laser device through the open end of the housing.

A feature of the present invention is the provision of thermometer-trimming apparatus wherein a laser beam strikes each thermometer at the same point with the same amount of energy thereby severing the excess mercury from the remainder of the mercury column to provide an efficient and reliable device.

Another feature of the present invention, is to provide a housing which prevents the leakage of light from the laser beam when a thermometer is in position to receive energy from the laser.

Other features and advantages of the present invention will become more apparent from a consideration of the following detailed description when taken in conjunction with the accompanying drawings, in which:

FIG. 1 is a perspective exploded view, partially in diagrammatic form, of a thermometer-trimming apparatus constructed in accordance with the present invention;

FIG. 2 is a partial sectional front view thereof; and

FIG. 3 is a sectional view taken along the line 3—3 of FIG. 2.

An apparatus constructed in accordance with the present invention is designated generally by the reference numeral 10 in the FIGS. and includes the laser head or laser device 12, and a fixture which is designated generally by the reference numeral 14. The fixture 14 includes a mounting 16 which is adapted to be connected with the laser device 12, and a housing 18, which is connected with the mounting 16. In the discussion which follows, the laser device 12 will not be described in detail. It is to be understood, however, that the mounting 16 is mounted on the laser device 12 in such a manner that the beam 20 from the laser device 12 passes through a lens, which is designated generally by the reference numeral 22, received in the mounting 16.

More specifically, as shown in FIG. 3, the mounting 16 includes a mounting plate 24 which is connected to the laser head or laser device 12 by any conventional means as by screws or the like. Connected to the mounting plate 24 by screws 26 is a housing retaining member 28. The member 28 is provided with an outwardly extending continuous peripheral flange 30 which defines a recessed wall 32. Provided in the mounting plate 24 and the housing retaining member 28, is a through bore 34 which receives the lens 22 therein. The lens 22 includes a lens barrel 36 which receives a focusing lens arrangement 38 therein. The lens barrel 36 is maintained in place by a set screw 40 which is received in a threaded opening in the lens 22. It will now be obvious that the mounting plate 24 is connected to the laser head or laser device 12 with the axis of the lens 22 aligned with the optical axis of the laser beam 20.

Mounted on the recessed wall 32 of the housing retaining member 28 are transversely spaced microswitches 42 and 44. The microswitches 42 and 44 are connected to the laser power supply 46 by respective leads 48 and 50. The power supply 46 is connected to the laser head 12 through a variable energy storage capacitor bank 52 by a lead 54. As noted in detail below, one of the microswitches 42 or 44 must be operated before the power supply 46 can apply energy to the laser head 12.

Housing 18 includes a top wall 56, a bottom wall 58, a front wall 60 which is integral with the walls 56 and 58, and opposed end walls 62 and 64. The side of the housing 18 opposite the wall 60 is open and the walls 62, 56, 64, and 58 adjacent to the open end of the housing 18 are provided with a continuous recessed groove 66 which receives the peripheral flange 30 of the housing retaining member 28 to form a rabbet joint therewith. The rabbet joint formed by the elements 30, 66 provide a lighttight connection between the housing 18 and the housing retaining member 28. The housing 18 may be connected to the member 28 by any conventional means as by screws (not shown) extending through the retaining member 28 and terminating in threaded apertures (not shown) in member 18.

The end walls 62 and 64 are provided with aligned elongated rectangular openings 68 and 70, respectively (FIG. 2). The opening 68 is defined by a recessed flange 72. Similarly, the opening 70 is defined by a recessed flange 74.

Slidably received in the housing 18 is a thermometer holder which is designated generally by the reference numeral 76. As shown in FIG. 2, the thermometer holder 76 includes a right-hand portion 78 and a left-hand portion 80. The right-hand portion 78 is defined by an outer wall 82 and an intermediate wall 84. The left-hand portion 80 is defined by the intermediate wall 84 and an outer wall 86. Since the portions 78 and 80 are identical in construction, only the portion 78 will be described in detail. However, the same reference numerals will indicate identical elements in the respective portions.

More specifically, a bottom rod 88 extends between the walls 82 and 86 and passes through an aperture 90 in the wall 84. The rod 88, which, in practice, is fabricated from nylon or the like, is provided with a longitudinal groove 92 which receives a pin 94 therein extending inwardly from the front wall 60. The pin 94 coacting with the groove 92 guide the thermometer holder 76 in its movement in the housing 18, as noted in detail below. The top of the rod 88 is provided with a longitudinal recess 96. Received in the recess 96 are respective blocks 98 and 100. The blocks 98 and 100 include respective lower sections 102 and 104 which meet each other along a central edge 106. The respective upper sections 108 and 110 of the blocks 98 and 100 are of smaller dimension than the respective lower sections to define substantially rectangular opening 112. The blocks 98 and 100 are maintained in place by screws 114 which extend upwardly through the rod 88 into the respective blocks and are recessed within the rod 88. A bar 116 is received on the upper edges of the blocks 98 and 100 and is connected thereto by screws 118 which are recesses within the bar. As shown in FIG. 2, the rod 88 is in sliding engagement with the edges of the flanges 72 and 74 and the bar 116 of the portion 78 is in sliding engagement with the upper edge of the flange 72. Similarly, the bar 116 of the portion 80 is in sliding engagement with the upper edge of the flange 74. Additionally, screws 120 connect the upper sections 108 and 110 of the blocks to the juxtaposed walls.

Thermometer retaining means is provided for retaining thermometers in the left and right-hand portions 80 and 78 of the thermometer holder 76. To be more specific, the edges of the blocks adjacent the central line 106 are provided with complementary formed bevels to provide V-shaped slot 121. The lower abutting corners of the blocks 98 and 100 are cut away to provide an opening 122 which is adapted to receive the reservoir of the thermometer. Centrally located in the opening 122 and extending through the rod 88 is a threaded bore 124 which receives a set screw 126 therein. The set screw 126 is operable to position the thermometer with respect to the laser beam 20, as noted in detail below.

Provided in the blocks 98 and 100 are opposed transverse aligned bores 128 and 130, respectively. Received within the bores 128 and 130 are respective springs 132 which bias balls 134 toward each other. The bores 130 are positioned so that the balls 134 engage the edges of a thermometer which is received in the slot 121 to retain the thermometer in position. The springs 132 resiliently maintain the balls in position but permit movement of the balls outwardly to facilitate the easy insertion or removal of the thermometer into the slot.

As shown in FIG. 2, the outer wall 82 is sized and positioned to abut the flange 72 defining the opening 68 when the right-hand portion 78 of the thermometer holder 76 is received within the housing 18 to provide a light trap to prevent energy from the laser beam from exiting through the opening 68. Additionally, the intermediate wall 84 is sized to engage the inner surface of the flange 74 defining the opening 70 when the right-hand portion 78 of the thermometer holder 76 is received within the housing 18 to provide a light trap which prevents energy from the laser beam from exiting through the opening 70. On the other hand, when the left-hand portion 80 of the thermometer holder 76 is received within the housing 18, the wall 86 is sized to engage the outer surface of the flange 74 to provide a light trap which prevents the energy from the laser beam 20 from exiting through the opening 70. Additionally, when the left-hand portion 80 is received in the housing 18, the intermediate wall 84 is sized to engage the inner surface of the flange 72 to provide a light trap which prevents the light from the laser beam 20 from exiting through the opening 68. As shown in FIG. 3, an outwardly extending pin 136 is received in the wall 84 and is positioned to engage the microswitch 42 or 44 to operate the same. More specifically, the pin 136 is positioned in the wall 84 so as to engage the microswitch 42 and operate the same when the right-hand portion 78 of the thermometer holder 76 is completely received within the housing 18. To put this another way, the microswitch 42 will only be operated when the light traps formed by the walls 82 and 84 and the respective flanges 72 and 74 are closed to prevent light from the laser head 12 from exiting through the end openings in the housing. Likewise, the pin 136 is positioned so that the microswitch 44 will be operated only when the left-hand portion 80 of the thermometer holder 76 is fully received within the housing 18 and the light traps formed by the walls 86 and 84 and the respective flanges 74 and 72 are closed to prevent energy from the laser beam 20 from again exiting through the end openings in the housing.

In the description of the operation of the apparatus 10 which follows, it will be assumed that the elements are positioned as shown in FIG. 2. Accordingly, a thermometer is inserted into the left-hand portion 80 of the thermometer holder 76 by inserting the thermometer into the V-shaped slot 121. As noted hereinabove, it is assumed that the thermometer which is to be trimmed is triangular in cross section so that it will fit snugly in the slot 121. However, if the thermometer has a cross section other than triangular, the slot 121 may be changed accordingly. The reservoir or bulb of the thermometer is positioned in the opening 122. The thermometer is moved downwardly into the bore 124 in the rod 88 until the bottom of the bulb of the thermometer rests against the set screw 126. The set screw 126 is then moved upwardly or downwardly by rotating the same in the threaded bore 124 until the point marking the desired height of the mercury column in the thermometer is in the same plane as the optical axis of the laser beam 20. That is, the set screw 126 provides a means for raising or lowering the thermometer so that the laser beam will strike the mercury column at the desired point. Once the set screw 126 has been set for desired height of the mercury thermometer, it does not have to change for the remaining thermometers of the same type. The balls 134 retain the thermometer in the slot 121 in the manner described above.

After the thermometer has been inserted into the thermometer holder 76, the thermometer holder is slid to the right, as taken in FIG. 2. Accordingly, the left-hand portion 80 of the holder will enter the housing 18 and the right-hand portion 78 will exit through the opening 68. The thermometer holder 76 continues moving toward the right until the intermediate wall 84 engages the flange 72 in a lighttight engagement and the outer wall 86 engages the flange 74 in a lighttight engagement. Accordingly, the thermometer will now be substantially centrally located within the housing 18. Simultaneously with the lighttight closing of the open ends of the housing 18, the pin 136 engages the microswitch 44 to allow triggering of the laser head. Thus, power will be applied to the laser head or device 12 through the variable energy storage capacitor bank 52 to produce a pulse of energy from the laser head 12.

FIG. 1 illustrates this operation for a thermometer T which is received in the right-hand portion 78 of the thermometer holder 76. Thus, the pulse of energy or laser beam 20 passes through the lens 22 and strikes the thermometer at the desired height in accordance with the setting of the set screw 126, as noted above. The lens 22 is adjusted to bring the laser beam 20 to a line focus which is perpendicular to the column of mercury in the capillary of the thermometer T. Accordingly, the mercury will vaporize at this point to break the mercury column.

The variable energy storage capacitor bank 52 is adapted to vary the input pulse energy and therefore the amount of energy in the laser beam 20. The energy storage is adjusted so that the energy which strikes the thermometer T will be sufficient to drive the excess mercury into a bulb B at the top of the thermometer T. Once the variable storage capacitor bank has been set to deliver a particular pulse of energy, it requires no further adjustment for thermometers of the same type. It is to be noted that the laser beam 20 in no way affects the glass thermometer but only has an effect on the mercury column by separating the excess mercury from the remainder of the mercury column.

It is to be noted that when one portion of the thermometer holder 76 is received within the housing 18, the other portion lies outside the housing and is easily accessible. Thus, while one thermometer is being subjected to the laser beam another thermometer may be loaded into the other portion of the thermometer holder. Thus, if the portion 80 is received within the housing 18, a thermometer may be inserted into the slot 121 in the right-hand portion 78 of the thermometer holder 76. After the thermometer within the housing has been subjected to the beam from the laser head 12, (the thermometer in the left-hand portion 80 in the example chosen) the holder 76 is moved toward the left as taken in FIG. 2. Thus, the thermometer loaded into the portion 78 is positioned within the housing 18. When the openings 68 and 70 are again closed by the respective walls 82 and 84 in lighttight engagement therewith, respectively, the pin 136 engages the microswitch 42 to again operate the power supply 46. Hence, the thermometer T now received in the portion 78 will be subjected to the laser beam.

At this time, the thermometer which has been operated upon by the laser beam is removed from the left-hand portion 80 of the thermometer holder 76 and the lower portion of the glass tube is severed from the bulb B containing the excess mercury and is sealed to provide an accurately trimmed thermometer. It is to be noted that if the mercury has not been driven into the bulb B, the thermometer may be taken and put in a centrifuge to drive the mercury into the bulb B in the conventional manner. Thereafter, the bulb B may be severed and the thermometer sealed.

In practice, a low-energy normal mode ruby laser may be utilized as the laser device or laser head 12.

Accordingly, a method for trimming a thermometer and an apparatus therefor has been described which accurately and reliably trims a thermometer to remove excess mercury from the mercury column in a quick and efficient manner without causing any damage to the thermometer tube.

What is claimed is:

1. A fixture for aligning a thermometer with a laser beam including a housing having at least one open end, mounting means for mounting said housing on a laser device in energy-receiving relationship therewith, thermometer-holding means including a thermometer retainer for orienting a thermometer in a preselected position and being movable through said open end between a first position in which said thermometer retainer is positioned external to said housing for the insertion and removal of a thermometer and a second position in which said thermometer retainer is positioned within said housing to align the thermometer with a laser beam, said fixture further including a light trap for sealing said housing when said thermometer-holding means is in said second position to prevent the leakage of energy from said laser device through said open end.

2. A fixture as in claim 1, and a lens received in said mounting means for focusing the beam from the laser device on the thermometer.

3. A fixture as in claim 1, in which said thermometer-holding means includes height adjusting means for selectively adjusting the height of the thermometer received in said thermometer retainer with respect to the laser beam.

4. A fixture as in claim 1, and switch means responsive to the second position of said thermometer-holding means for energizing the laser device.

5. A fixture as in claim 1, in which said thermometer-holding means is provided with an end wall, said end wall being sized and positioned to engage said housing in a lighttight engagement to provide said light trap.

6. A fixture as in claim 5, in which said housing includes a recessed flange surrounding said open end, said end wall engaging said recessed flange when said thermometer-holding means is in said second position to provide said light trap.

7. A fixture as in claim 1, in which said housing includes opposed open ends, means for slidably mounting said thermometer-holding means on said housing for movement through said open ends, said thermometer retainer being a first thermometer retainer, said thermometer-holding means including a second thermometer retainer connected to said first thermometer retainer whereby said second thermometer retainer is received within said housing to align a thermometer with the laser beam when said first thermometer retainer is in said first position and is positioned external of said housing for the insertion and removal of a thermometer when said first thermometer retainer is in said second position, and light trap means for engaging said housing in a lighttight engagement when said first thermometer retainer is in said first position and said second thermometer retainer is positioned within said housing.

8. A fixture as in claim 7, and switch means operable to energize the laser device when said first thermometer retainer is in said first or said second position.

9. A fixture as in claim 7, in which said thermometer-holding means includes first and second end walls associated with said first and second thermometer retainers, and an intermediate wall separating said first and second thermometer retainers and slidably received in said housing, said light trap means including said second end wall and said intermediate wall which are sized and positioned to engage said housing adjacent the open ends thereof to provide light seals adjacent the respective open ends.

10. Apparatus for trimming a thermometer comprising laser means for producing a laser beam when energized, selectively operable energizing means for energizing said laser means, a fixture connected to said laser means for aligning a thermometer with said laser beam, said fixture including a housing having at least one open end, thermometer-holding means including a first thermometer retainer for orienting a thermometer in a preselected position and being movable through said open end between a first position in which said thermometer retainer is positioned external to said housing for the insertion and removal of a thermometer and a second position in which said thermometer retainer is positioned within said housing to align the thermometer with said laser beam, said thermometer-holding means including light trap means for preventing passage of the laser beam through said open end when said first thermometer retainer is in said second position.

11. Apparatus as in claim 10, in which said thermometer-holding means includes a second thermometer retainer connected to said first thermometer retainer and being positioned external of said housing when said first thermometer retainer is in said second position and being positioned within said housing when said first thermometer retainer is in said first position.

12. Apparatus as in claim 11, in which said housing is provided with opposed open ends, said first thermometer retainer being adapted to move through one of said open ends, said second thermometer retainer being adapted to be moved through the other of said open ends.

13. Apparatus as in claim 12, in which said light trap means includes an intermediate wall between said first and second thermometer retainers, said intermediate wall being sized and positioned to engage said housing adjacent said one open end when said first thermometer retainer is in said first position to light-tightly seal said one opening, said intermediate wall engaging said housing adjacent the other open end to light-tightly seal said other open end when said first thermometer retainer is in said second position.

14. Apparatus as in claim 13, in which said light trap means further includes a first end wall connected to said first thermometer retainer and a second end wall connected with said second thermometer retainer, respective recessed flanges adjacent to the open ends of said housing, said end wall associated with said first thermometer retainer engaging the recessed flange associated with said one open end of said housing when said first thermometer retainer is in said second position to prevent the passage of the laser beam therethrough, said second end wall engaging the flange adjacent said other open end when said first thermometer retainer is in said first position to prevent the passage of said laser beam through said other open end.

15. Apparatus as in claim 11, and adjusting means in said first and second thermometer retainers for selectively adjusting the height of thermometers received therein.

16. Apparatus as in claim 10, and a lens for bringing said laser beam to a line focus perpendicular to a thermometer received in said first and second thermometer retainers.

17. Apparatus as in claim 11, in which said energizing means includes switch means responsive to the first and second position of said first thermometer retainer for energizing said laser means.

* * * * *